(12) United States Patent
Carvalho (10) Patent No.: US 11,272,683 B2
(45) Date of Patent: Mar. 15, 2022

(54) ARRANGEMENT FOR A PUPPY LAVATORY WITH DISCHARGE CONNECTED TO THE DRAIN

(71) Applicant: Fabio Gaspar De Carvalho, Várzea da Barra Funda (BR)

(72) Inventor: Fabio Gaspar De Carvalho, Várzea da Barra Funda (BR)

(*) Notice: Subject to any disclaimer, the term of this patent is extended or adjusted under 35 U.S.C. 154(b) by 360 days.

(21) Appl. No.: 16/467,840

(22) PCT Filed: Nov. 30, 2017

(86) PCT No.: PCT/BR2017/050365
§ 371 (c)(1),
(2) Date: Jun. 7, 2019

(87) PCT Pub. No.: WO2018/102897
PCT Pub. Date: Jun. 14, 2018

(65) Prior Publication Data
US 2021/0195864 A1    Jul. 1, 2021

(30) Foreign Application Priority Data

Dec. 8, 2016 (BR) ................ BR20 2016 028791.5

(51) Int. Cl.
*A01K 1/01* (2006.01)
(52) U.S. Cl.
CPC .................................. *A01K 1/011* (2013.01)
(58) Field of Classification Search
CPC .... A01K 1/011; A01K 1/0114; A01K 1/0117; A01K 1/0121; A01K 1/0135; A01K 1/01; A01K 1/0107

USPC ........ 119/166, 161, 450, 163, 165, 162, 479
See application file for complete search history.

(56) References Cited

U.S. PATENT DOCUMENTS

| 3,318,285 A | 5/1967 | Betham |
| 3,734,057 A * | 5/1973 | Lee .......................... A01K 1/011 119/163 |
| 3,842,803 A * | 10/1974 | Temel .................... A01K 1/011 119/163 |
| 4,117,555 A * | 10/1978 | Dennis ................... A01K 1/011 119/163 |

(Continued)

FOREIGN PATENT DOCUMENTS

BR    7901264 U    3/2001
BR    PI0600489 A    10/2007

(Continued)

OTHER PUBLICATIONS

International Preliminary Report On Patentability, PCT/BR2017/050365, dated Jun. 20, 2019, 7 Pages.

(Continued)

*Primary Examiner* — Yvonne R Abbott-Lewis
(74) *Attorney, Agent, or Firm* — Goodhue, Coleman, Owens, P.C.

(57) ABSTRACT

Consisting of a toilet (1) for dogs composed of a tray (2), in rigid material, with concentric indentations (3) running towards a central hole (4) from where a dogleg (5) originates with piping (6) into the sewer (E) where the urine of the animal is carried away with the water from the perimeter of said tray (2) that arrives through the hose (6') connected to the tap (7) and/or the recycled water (8).

20 Claims, 7 Drawing Sheets

(56) References Cited

U.S. PATENT DOCUMENTS

| | | | | |
|---|---|---|---|---|
| 4,649,578 | A * | 3/1987 | Vargo | A01K 1/0114 119/161 |
| 4,660,506 | A * | 4/1987 | Nalven | A01K 1/011 119/163 |
| 5,048,463 | A * | 9/1991 | Wilson | A01K 1/011 119/163 |
| 5,355,837 | A * | 10/1994 | Reyes | A01K 1/0107 119/161 |
| 6,079,363 | A * | 6/2000 | MacLaine | A01K 1/0125 119/161 |
| 9,737,045 | B1 * | 8/2017 | Scanlan | A01K 1/0107 |
| 2006/0249090 | A1 * | 11/2006 | Ahad | A01K 1/011 119/163 |
| 2007/0068461 | A1 * | 3/2007 | Hill | A01K 1/0114 119/166 |
| 2007/0289541 | A1 * | 12/2007 | Giardina | A01K 1/011 119/165 |
| 2008/0105207 | A1 * | 5/2008 | Gloor | A01K 1/011 119/161 |
| 2008/0178817 | A1 * | 7/2008 | Brewer | A01K 1/011 119/163 |
| 2010/0050951 | A1 * | 3/2010 | Maguire | A01K 1/0114 119/165 |
| 2013/0047928 | A1 * | 2/2013 | Banasco | A01K 1/0107 119/165 |
| 2013/0098301 | A1 * | 4/2013 | Matsuo | A01K 1/0114 119/169 |
| 2013/0228133 | A1 * | 9/2013 | Kennington | A01K 1/0114 119/161 |

FOREIGN PATENT DOCUMENTS

| | | |
|---|---|---|
| BR | PI0604157 A | 5/2008 |
| BR | MU8700038 U | 9/2008 |
| BR | 132012016842 | 11/2015 |
| DE | 2658140 A1 | 7/1978 |
| WO | 2008034208 A2 | 3/2008 |

OTHER PUBLICATIONS

International Report & Written Opinion, PCT/BR2017/050365, dated Feb. 15, 2018, 8 Pages.

* cited by examiner

ARRANGEMENT FOR A PUPPY LAVATORY WITH DISCHARGE CONNECTED TO THE DRAIN

The present application concerns a useful improvement for an original arrangement applied to a toilet for dogs with a flush connected to the sewer, specifically for a toilet for dogs with a water inlet connected to a tap and directly connected to the sewer, so that when the animal urinates onto a perforated rubber mat, you only need to open the cited tap for the water to circulate around the perimeter of the tray so that the liquid with the waste is directed to a central outlet and thence to the drain, thus preventing bad odors and the use and/or changing of diapers/newspapers, and the need for daily cleaning of the mat. The opening may be done either manually or through a timer/presence sensor.

FIELD OF APPLICATION

The field of application of the innovation hereby claimed is the pet segment, more specifically that of utensils for animals to urinate into.

STATE OF THE ART

The current state of the art comprises some patent documents that concern toilets for animals such as U.S. Pat. No. 8,522,719—consisting of two main parts: comprising a fully disposable integrated unit that is fully impermeable to liquids and a section of live grass free of soil to be installed in an appropriate cavity. The integration of these elements into a fully disposable and easy-to-carry unit is what constitutes the invention.

The above priority concerns a toilet whose device the pet owner must change over time, since it does not offer self-cleaning or connection to the sewer, and is thus different from the application hereby claimed.

BR102013021824-3—consists of a floor comprising a circular-shaped tray gently inclined towards the center that has a hole, with a circular lid of a size slightly larger than the center hole, which is connected to the tray by two rods that keep it 5 cm above the floor. A fence is attached to the top of the tray that is also circular with a small outward tilt, where the male dogs can urinate, and there is an entrance space in the front part for the animals to enter. The flush box is fastened over the back part of the fence.

The tray of the above invention is not provided with a perforated rubberized mat and is also not connected to a water tap, which causes the animal to slip during use and requires regular manual flushing.

OBJECTIVES OF THE INVENTION

The objective of the present innovation is to provide a toilet for dogs with running water, which only requires the opening of a tap, and which is directly connected to the sewer, so that the animal's urine is naturally removed and does not leave a bad odor in the environment.

The objective of this innovation is to provide a toilet for dogs that offers safety to the animal, since the tray is coated with a hollow rubberized mat that allows the urine to flow in the direction of the outlet into the sewer.

The objective of this innovation is to provide a toilet for dogs of great practicality, since there is no need for daily manual cleaning of the mat, its being sufficient to activate the tap/flush in accordance with the animal's use.

The objective of this innovation is to provide a toilet that promotes the well-being of the dog and the people around it, who do not have to put up with unpleasant odors.

The objective of this innovation is to provide an environmentally-friendly toilet by rendering the use of disposable diapers unnecessary. In addition to this, the volume of water used is lower in the flush than that used in cleaning the washing areas of the current toilets.

ABSTRACT OF THE INNOVATION

The Arrangement Applied to a Toilet for Dogs with a Flush Connected to the Sewer consists of a toilet composed of a perforated rubber mat, which is positioned in a tray made of rigid material with indentations directed toward the center where a hole is located which carries the waste to the sewer by means of an appropriate connection, which waste is washed away by a water jet on the perimeter of the tray deriving from a connection to a tap which is opened when the animal uses the toilet. The tap is not exclusive to the toilet and may derive from a "T".

In one constructive variation the water supply may come from a water tank for recycling water from a washing machine or rainwater, for example.

DESCRIPTION OF THE FIGURES

Below are presented figures to better explain the patent application in an illustrative and non-limiting manner.

DETAILED DESCRIPTION OF INNOVATION

Figure 1:
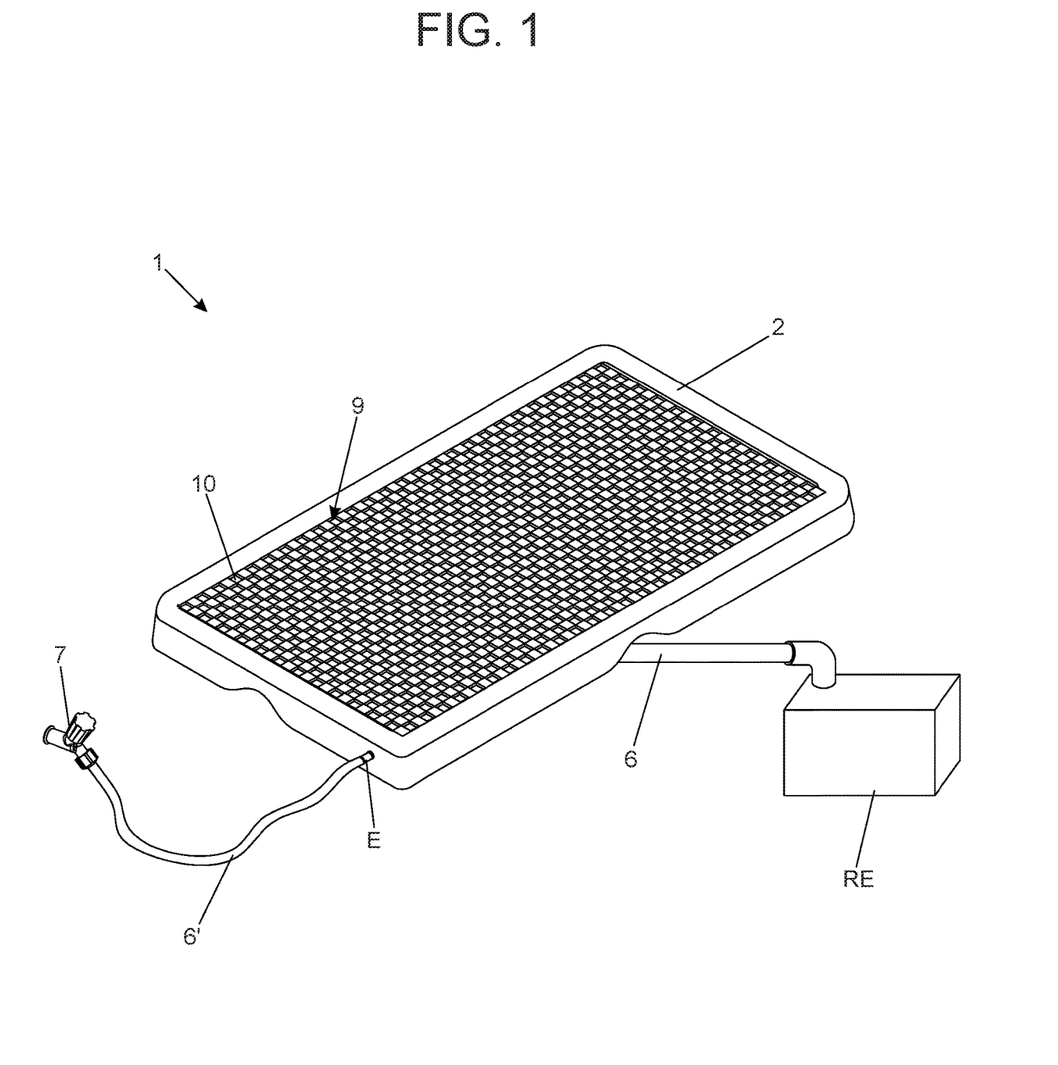
FIG. 1: Perspective view of the arrangement applied to a toilet for dogs with a flush connected to the sewer.
Figure 2:
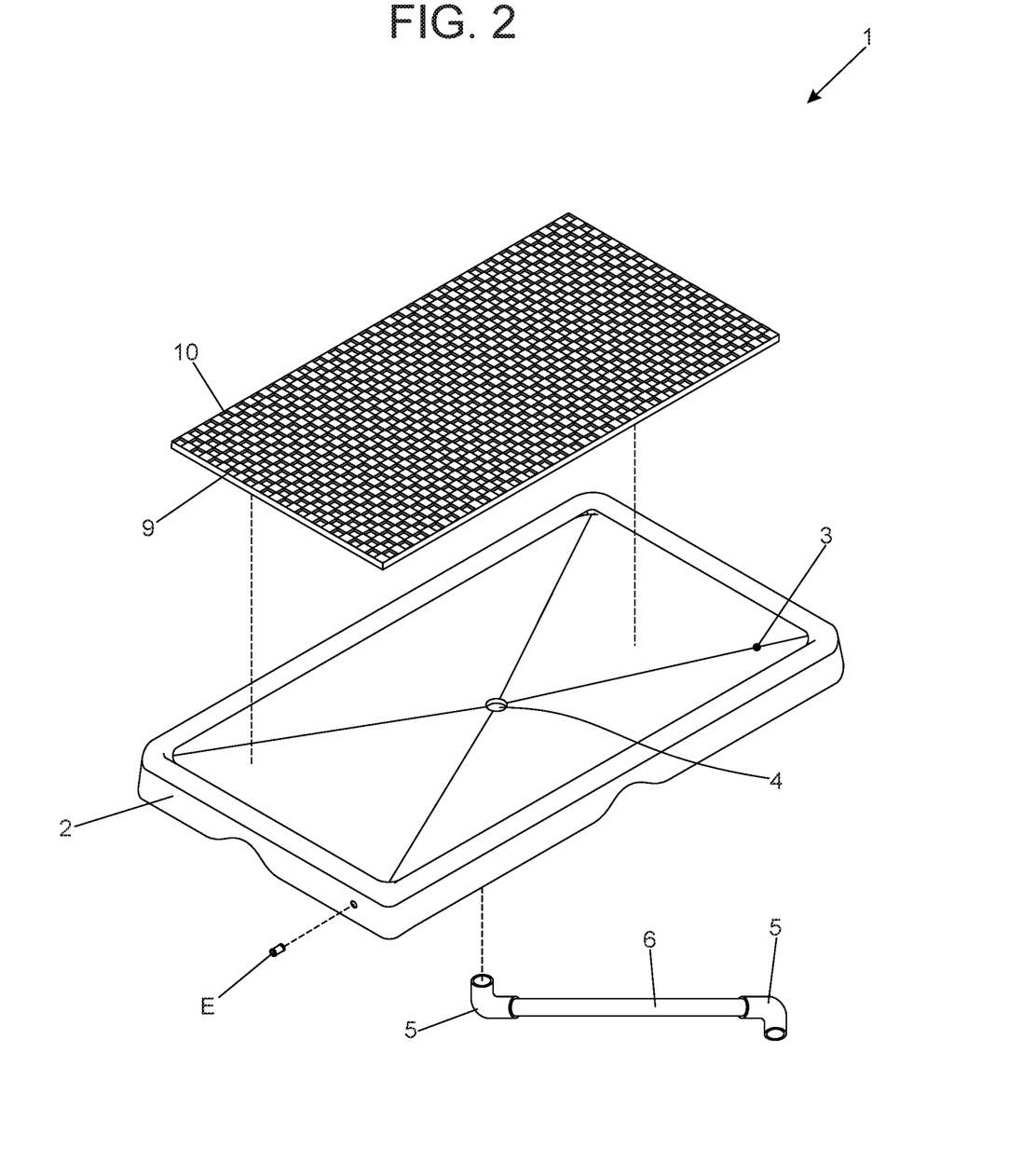
FIG. 2: Exploded perspective view of the arrangement applied to a toilet for dogs with a flush connected to the sewer.
Figure 3:
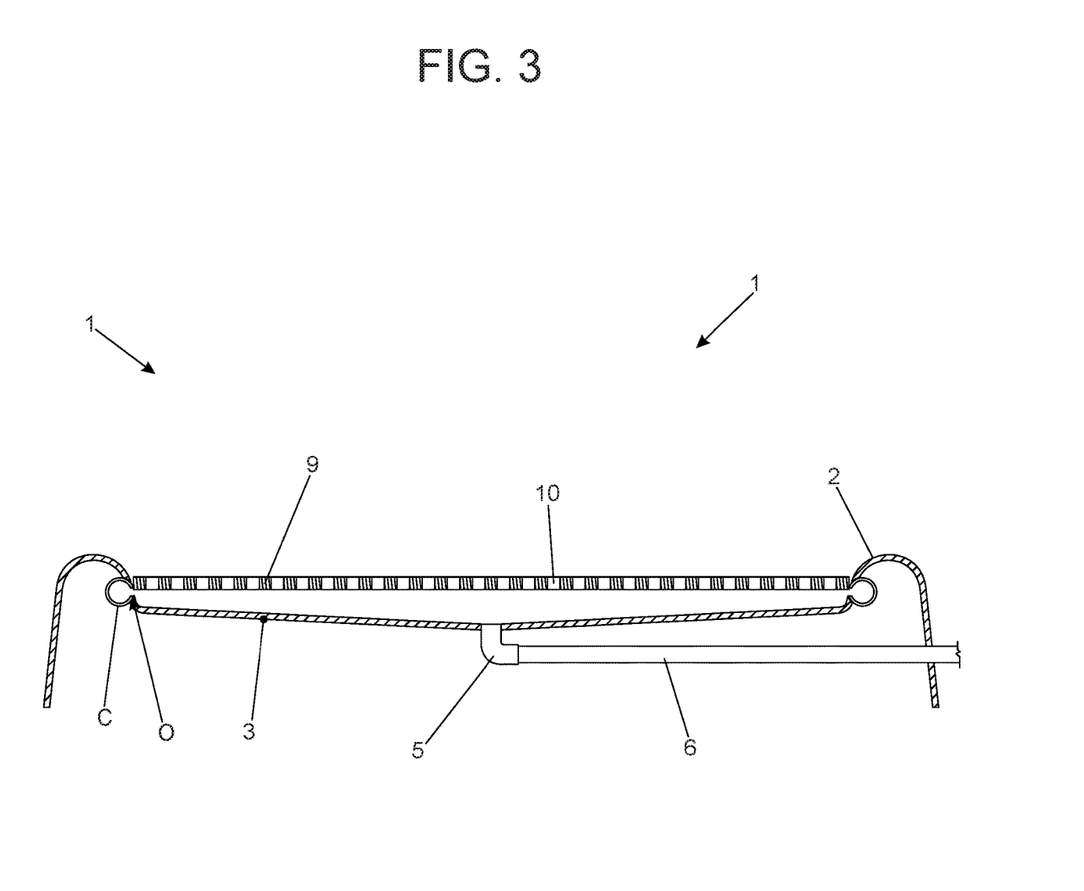
FIG. 3: Lateral view in cross-section of the arrangement applied to a toilet for dogs with a flush connected to the sewer.
Figure 4:
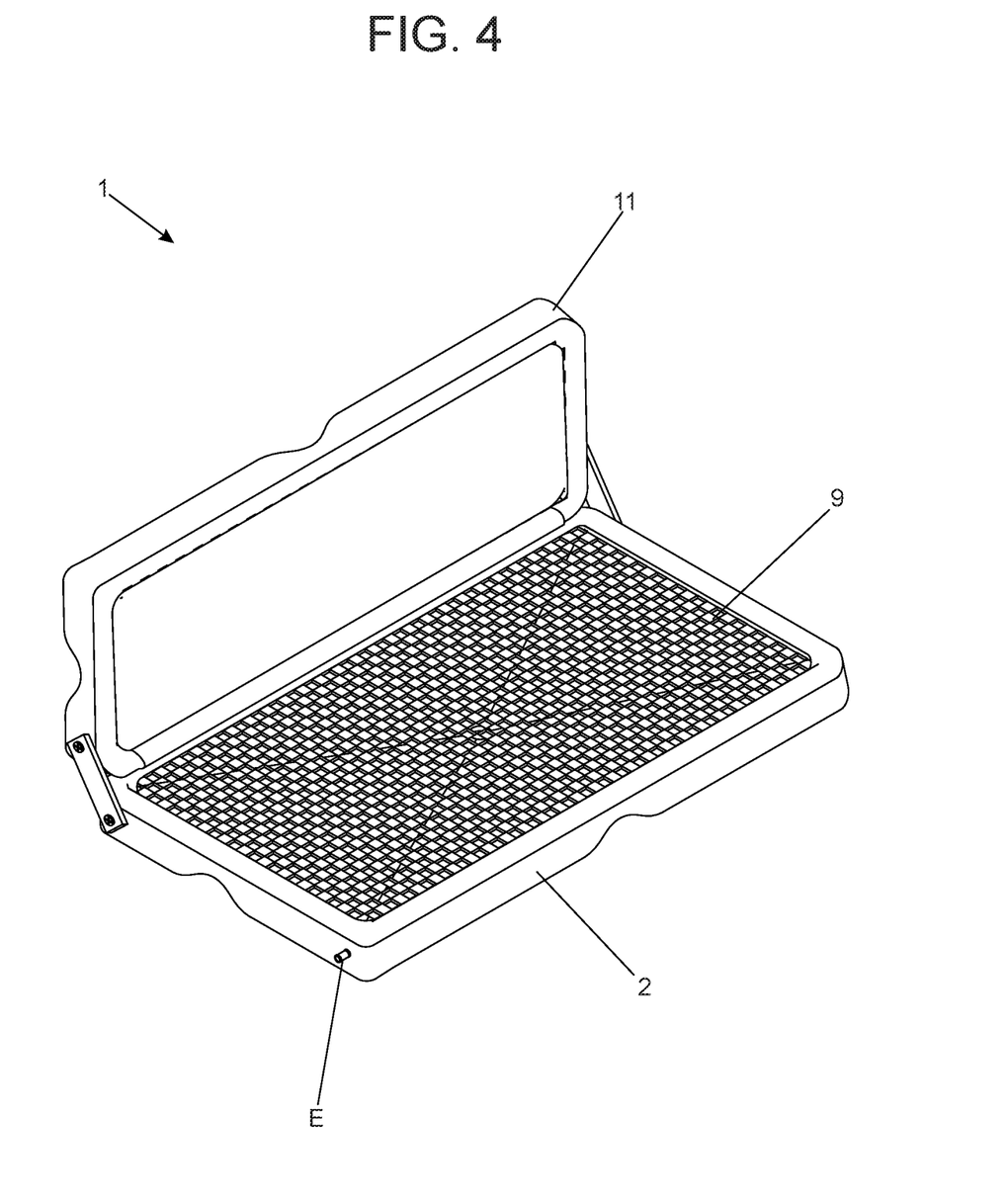
FIG. 4: Perspective view of the arrangement applied to a toilet for dogs with a flush connected to the sewer in a constructive variation with a border for male dogs.
Figure 5:
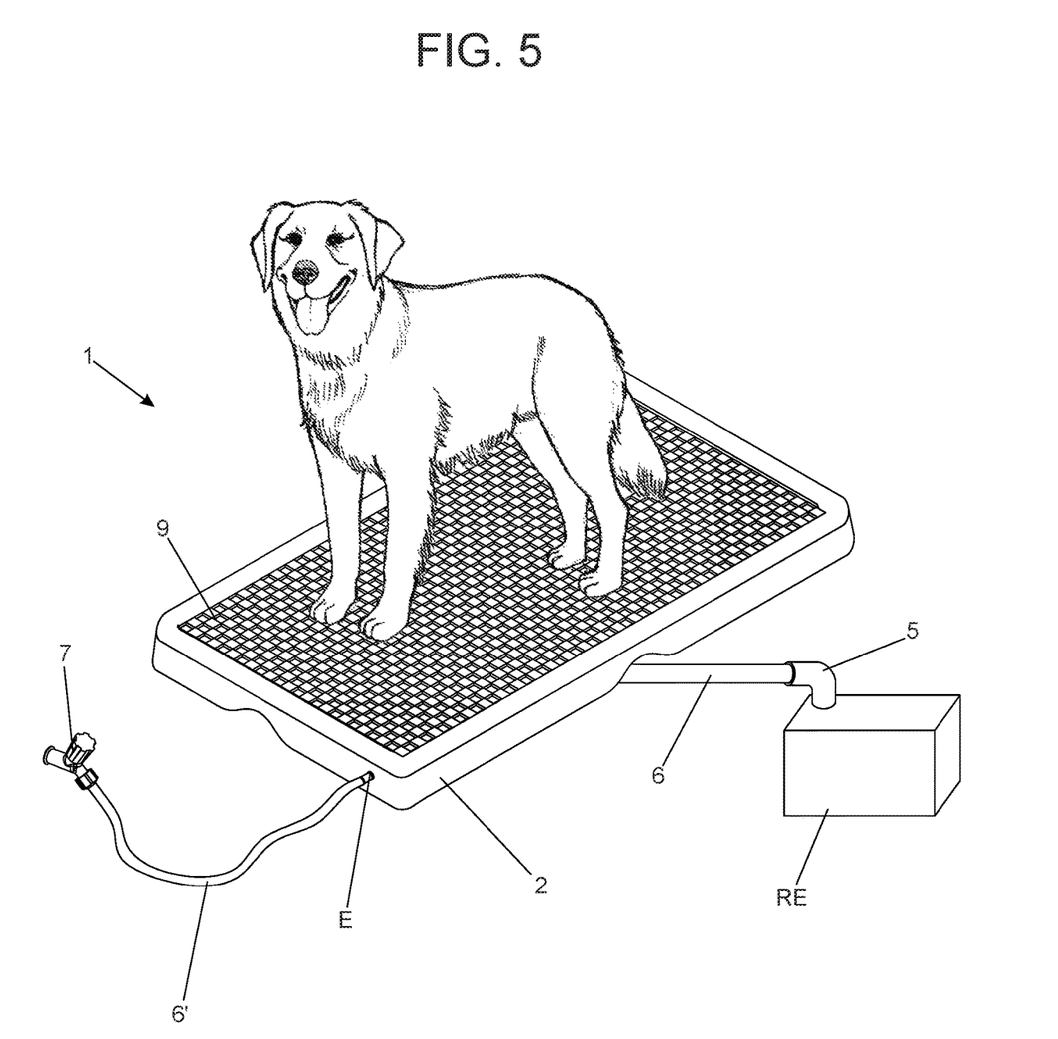
FIG. 5: Perspective view of the arrangement applied to a toilet for dogs with a flush connected to the sewer, showing use.
Figure 6:
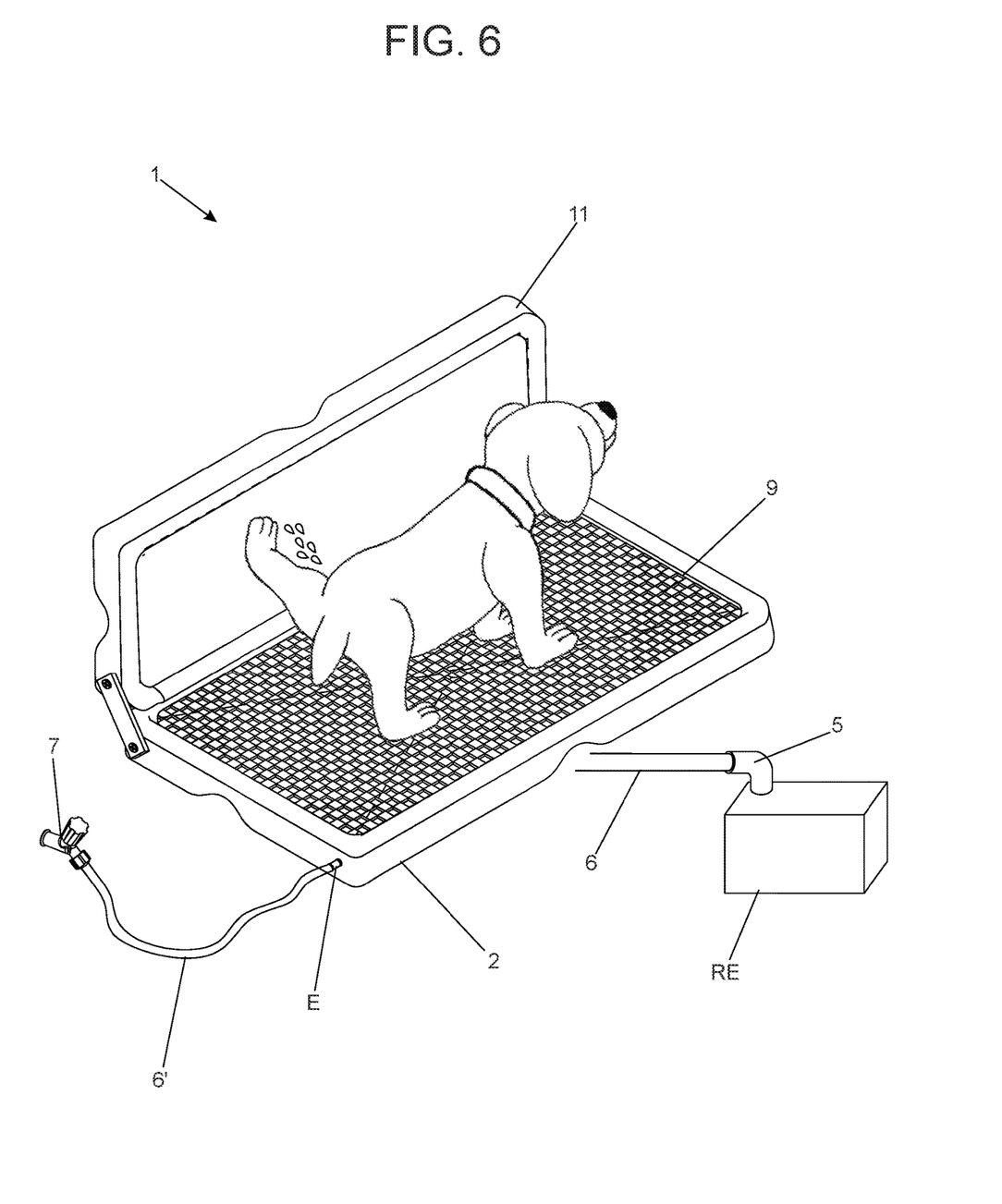
FIG. 6: Perspective view of the arrangement applied to a toilet for dogs with a flush connected to the sewer, showing use in the option for male dogs.
Figure 7:
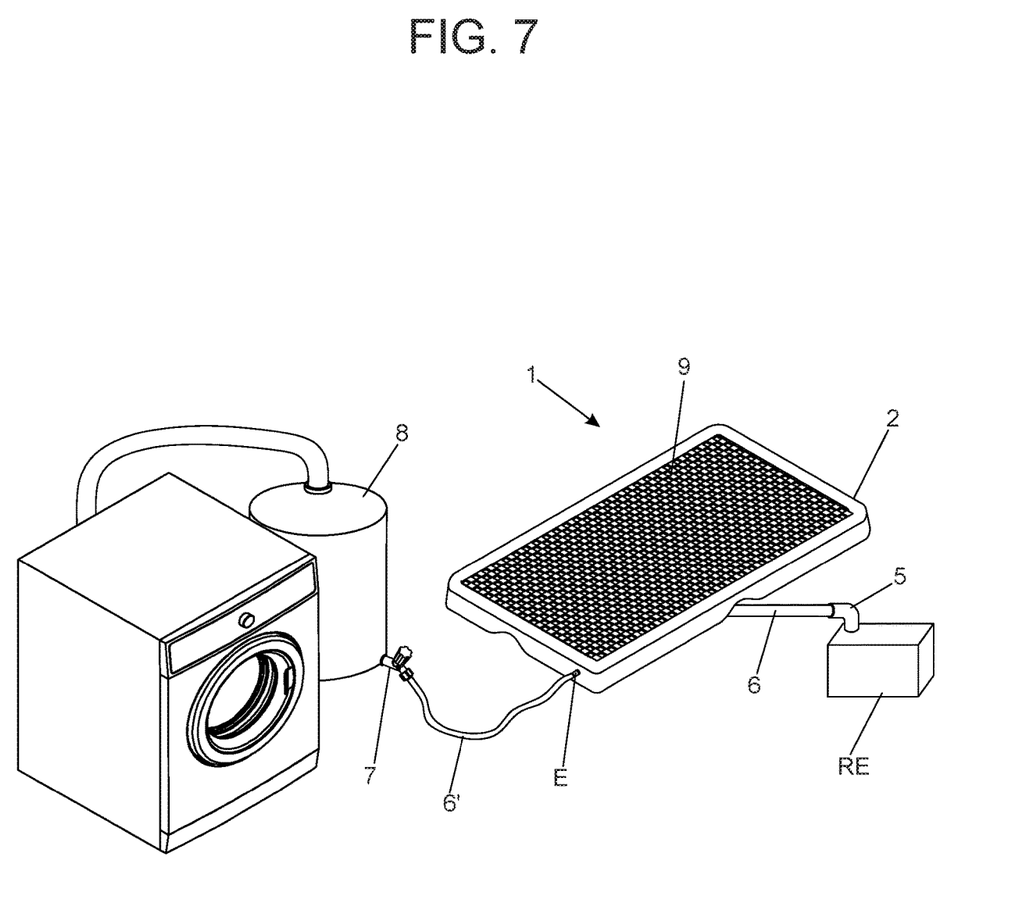
FIG. 7: Perspective view of the arrangement applied to a toilet for dogs with a flush connected to the sewer, showing the option for recycling water from the washing machine, stored in a specific tank.

The Arrangement Applied to a Toilet for Dogs with a Flush Connected to the Sewer, the object of this patent application for a useful improvement, consists of a toilet (1) for dogs composed of a tray (2), in rigid material, with concentric indentations (3) towards a central hole (4) where a dogleg (5) is located with piping (6) into the sewer (E) where the animal's urine is carried along with the water from the perimeter of the cited tray (2) which arrives through the hose (6') connected to the tap (7) and or the recycled water (8).

More specifically, the innovation consists of a toilet (1) for dogs composed of a mat (9) that is rubberized and perforated (10), which is positioned on a tray (2) made from rigid material raised from the ground which possesses indentations (3) which run from the corners to the center where a hole is located (4) with a dogleg (5) from where a pipe originates (6) extending into the sewage network (RE) thus enabling the drainage of the urine of the animal that relieves itself on said mat. (9). For the inlet of the flush water, the bathroom (1) has a perimeter channel (C) that runs around the tray (2) with small holes (O), which is connected by means of a quick coupling (E) the hose (6') and "T" tap (7) being open in accordance with the need or by the activation of the timer/presence sensor, thus washing the surface of the tray (2) and carrying the waste found there into the sewer (RE), eliminating any possibility of unpleasant odors. In a constructive variation the water used for the flush can be recycled (8) from the washing machine or rainwater, which is stored in a specific tank for this purpose. In another constructive variation, the tray (2) has a pediment (11) which, when raised, allows male dogs to urinate.

Thus, various forms of use can be adopted with the innovation, starting with the horizontal tray (2) for female and/or male dogs and the tray with the posterior pediment (11) for male dogs, with the user deciding what is most suitable at any given moment.

The invention claimed is:

1. A puppy lavatory with discharge system with a flush, the system comprising:
   a perforated and rubberized mat, wherein the mat is positioned on a tray;
   the tray comprising rigid material which possesses concentric indentations that run from the corners to a center of the tray;
   a central hole is located in the center of the tray;
   a pipe originating from the center hole and extending into a drain enabling the drainage of an animal's urine; and
   a perimeter channel that runs round a perimeter of the tray with a plurality of small holes configured to allow water to enter the tray at the perimeter of the tray, wherein the perimeter channel washes the surface of the tray and carries the waste from the tray into the drain utilizing the pipe.

2. The system of claim 1, wherein the perimeter channel is opened according to the need or through the activation of the timer/presence sensor.

3. The system of claim 1 wherein the tray is raised from the ground.

4. The system of claim 1 wherein the perimeter channel is connected by means of a quick coupling a hose to the mat and a water source.

5. The system of claim 4, wherein the water source comprises recycled water.

6. The system of claim 1, wherein in the tray has a back pediment configured to be raised perpendicular to the tray and configured to allow male dogs to urinate.

7. The system of claim 1, wherein the drain is a sewer network.

8. A toilet for discharging animal urine, the apparatus comprising:
   a water inlet connecting the toilet to a water source;
   a tray having a hole for collecting and draining animal urine and water from the water source;
   a perforated rubberized mat disposed within a perimeter of the tray; and
   a pipe connecting the tray to a drainage source;
   wherein the water inlet is opened allowing the water to circulate around the perimeter of the tray so that the water with the animal urine is directed to the hole and into the pipe.

9. The toilet of claim 8, wherein the tray possesses concentric indentations that run from the corners to a center of the tray, wherein the concentric indentations are configured to direct the animal urine and water to the center of the tray.

10. The toilet of claim 8, wherein the water inlet is directly connected to a sewer network.

11. The toilet of claim 8, wherein the toilet is self-cleaning.

12. The toilet of claim 8, wherein the tray comprises a water jet on the perimeter of the tray deriving from a connection to the water inlet.

13. The toilet of claim 8, wherein the hole comprises a dogleg.

14. The toilet of claim 8, wherein the tray comprises a perimeter channel that runs around the perimeter of the tray with small holes.

15. The toilet of claim 14, wherein the perimeter channel is connected to the water inlet by a hose.

16. A method for draining animal urine from a puppy lavatory, the method comprising:
   collecting animal urine on a puppy lavatory, the puppy lavatory comprising a perforated mat within a tray and a hole;
   flushing water from a water inlet through a hose connected to the puppy lavatory, wherein the water enters the tray through a perimeter channel;
   removing animal urine from the mat and tray with the water; and
   draining the water and animal urine through the hole into a drain.

17. The method of claim 16, further comprising:
   moving the water through the tray towards the hole utilizing indentations in the tray.

18. The method of claim 16, further comprising:
   raising a back pediment perpendicular to the tray, wherein the back pediment is configured to allow male dogs to urinate.

19. The method of claim 16, wherein the water inlet is a tap.

20. The method of claim 16 further comprising:
   opening the perimeter channel through an activation of a timer or presence sensor.

* * * * *